(12) United States Patent
Luchner et al.

(10) Patent No.: US 11,110,821 B2
(45) Date of Patent: Sep. 7, 2021

(54) SLIDING CENTER MODULE SYSTEM FOR VEHICLE

(71) Applicant: Byton North America Corporation, Santa Clara, CA (US)

(72) Inventors: Wolfram Luchner, Los Altos Hills, CA (US); Eric Veit, Cupertino, CA (US); Hans Fuchs, Pfaffenhofen (DE); Peter Ratz, Herrsching (DE)

(*) Notice: Subject to any disclaimer, the term of this patent is extended or adjusted under 35 U.S.C. 154(b) by 0 days.

(21) Appl. No.: 16/272,756

(22) Filed: Feb. 11, 2019

(65) Prior Publication Data
US 2020/0254906 A1    Aug. 13, 2020

(51) Int. Cl.
*B60N 2/06* (2006.01)
*B60K 37/00* (2006.01)
(Continued)

(52) U.S. Cl.
CPC .............. *B60N 2/062* (2013.01); *B60K 37/00* (2013.01); *B60N 2/01* (2013.01); *B60N 2/01583* (2013.01);
(Continued)

(58) Field of Classification Search
CPC ........ B60N 2/01; B60N 2/062; B60N 2/0737; B60N 2/074; B60N 2/0742; B60N 2/0745;
(Continued)

(56) References Cited

U.S. PATENT DOCUMENTS

| | | | | |
|---|---|---|---|---|
| 2,839,312 A | * | 6/1958 | Barenyi | ................. B62D 31/00 280/775 |
| 2,858,877 A | | 11/1958 | Krause | |

(Continued)

FOREIGN PATENT DOCUMENTS

| | | | | |
|---|---|---|---|---|
| CN | 206171241 U | | 5/2017 | |
| DE | 19624686 | * | 1/1997 | ............. B60K 37/00 |

(Continued)

OTHER PUBLICATIONS

The International Search Report and Written Opinion of PCT Application No. PCT/CN2020/074770 dated Apr. 24, 2020, 8 pages.
(Continued)

*Primary Examiner* — Gregory A Blankenship
(74) *Attorney, Agent, or Firm* — Womble Bond Dickinson (US) LLP

(57) ABSTRACT

A vehicle in one embodiment includes a driver module which can include a driver seat and a driver control assembly both of which are movably coupled to a chassis of the vehicle to allow the driver module to move between a center position and at least one of a left position and a right position along a first row in the interior of the vehicle. In one embodiment, the driver control assembly includes a steering wheel, a brake pedal, and an accelerator pedal. In one embodiment, a driver can drive the vehicle in any one of these positions. In one embodiment, the vehicle further includes a first rear seat and a second rear seat coupled to the chassis in a second row in the interior of the vehicle. In one embodiment, passengers in the rear seats can extend their legs into the first row when the driver seat is in the center position. In one embodiment, the driver seat and the driver control assembly are movable laterally along a set of rails coupled to the chassis of the vehicle. Other embodiments are also described.

35 Claims, 10 Drawing Sheets

(51) Int. Cl.
  *B60K 26/02* (2006.01)
  *B60T 7/06* (2006.01)
  *B60N 2/01* (2006.01)
  *B60N 2/07* (2006.01)
  *B60N 2/015* (2006.01)

(52) U.S. Cl.
  CPC ............ *B60N 2/074* (2013.01); *B60N 2/0745* (2013.01); *B60T 7/06* (2013.01); *B60K 2026/026* (2013.01)

(58) Field of Classification Search
  CPC ........ B60N 2/01583; B60N 2002/0268; B60N 2002/0296; B60K 2023/005; B60K 2026/026; B60K 2026/027; B60K 2026/028; B60K 37/00; B60K 37/02; B60K 37/04; B60K 37/06; B62D 31/003; B62D 25/14; B60T 7/042; B60T 7/06
  USPC ....... 296/64, 65.11, 65.12, 70; 180/326, 330
  See application file for complete search history.

(56) References Cited

U.S. PATENT DOCUMENTS

| | | | |
|---|---|---|---|
| 4,392,546 A | 7/1983 | Brown et al. | |
| 5,218,920 A * | 6/1993 | Kobayashi | B62D 1/18 114/144 R |
| 5,538,309 A * | 7/1996 | Murray | B60J 5/0473 296/146.9 |
| 6,086,142 A * | 7/2000 | Simmons | B62D 33/0633 296/190.01 |
| 6,692,051 B1 * | 2/2004 | Cook | B60N 2/062 296/190.01 |
| 6,752,444 B2 * | 6/2004 | Kitano | B60R 7/04 296/184.1 |
| 6,857,498 B2 * | 2/2005 | Vitale | B60K 37/00 180/326 |
| 6,971,471 B2 * | 12/2005 | Baker | B60N 2/90 180/329 |
| 6,991,060 B2 | 1/2006 | Chernoff et al. | |
| D630,987 S | 1/2011 | Edwards et al. | |
| D632,237 S | 2/2011 | Green | |
| 8,979,175 B2 * | 3/2015 | Kim | B62D 33/073 296/190.04 |
| D796,403 S | 9/2017 | Ahn et al. | |
| D812,538 S | 3/2018 | Lokers | |
| D813,132 S | 3/2018 | Armigliato et al. | |
| D849,625 S | 5/2019 | Yamamoto et al. | |
| 2003/0141736 A1 * | 7/2003 | Chernoff | B60N 2/14 296/65.01 |
| 2004/0062608 A1 * | 4/2004 | Auf der Springe | E01C 19/26 404/122 |
| 2005/0283288 A1 * | 12/2005 | Howell | B62D 1/18 701/41 |
| 2006/0220411 A1 | 10/2006 | Pathak et al. | |
| 2008/0203753 A1 * | 8/2008 | Klein | B62D 33/0625 296/65.13 |
| 2010/0187850 A1 * | 7/2010 | Murray | B60N 2/36 296/64 |
| 2010/0300796 A1 * | 12/2010 | Ryan | B60N 2/143 180/329 |
| 2011/0012390 A1 * | 1/2011 | Baumann | B60J 7/11 296/210 |
| 2012/0048639 A1 * | 3/2012 | Haubrich | E02F 9/166 180/425 |
| 2013/0193732 A1 * | 8/2013 | Brand | B60N 2/0875 297/344.21 |
| 2015/0360586 A1 * | 12/2015 | Mahler | B60N 2/062 297/344.1 |
| 2015/0360593 A1 * | 12/2015 | Mahler | B60N 2/767 297/411.32 |
| 2016/0221472 A1 * | 8/2016 | Deshmukh | B60R 22/12 |
| 2017/0028876 A1 * | 2/2017 | Yamada | B60N 2/06 |
| 2017/0267124 A1 * | 9/2017 | Numazawa | B60N 2/06 |
| 2017/0267126 A1 | 11/2017 | Reuschel et al. | |
| 2017/0313208 A1 * | 11/2017 | Lindsay | B60N 2/0248 |
| 2018/0134180 A1 * | 5/2018 | Ajisaka | E05F 15/60 |
| 2019/0248236 A1 * | 8/2019 | Sweet | B60K 35/00 |
| 2019/0375313 A1 * | 12/2019 | Biberdorf | B62D 33/0617 |
| 2020/0139853 A1 * | 5/2020 | Nawrocki | B60N 2/12 |
| 2020/0171979 A1 * | 6/2020 | Yetukuri | B60N 2/002 |
| 2020/0171983 A1 * | 6/2020 | Dry | B60N 2/062 |
| 2020/0223328 A1 * | 7/2020 | Kobayashi | B60K 37/06 |
| 2020/0254906 A1 * | 8/2020 | Luchner | B60N 2/0745 |

FOREIGN PATENT DOCUMENTS

| | | | | |
|---|---|---|---|---|
| DE | 102007062581 | * | 6/2009 | ........... B60N 2/0745 |
| FR | 2844498 B1 | | 3/2004 | |
| JP | 6124632 A | | 2/1986 | |

OTHER PUBLICATIONS

Engadget, "https://www.youtube.com/watch?v=thObS140qOM" Aug. 27, 2018, at 00:30 sec, 00:35 sec, 00:38 sec, 00:57 sec, and 01:00 min, video 2:40 total, 5 pages.

* cited by examiner

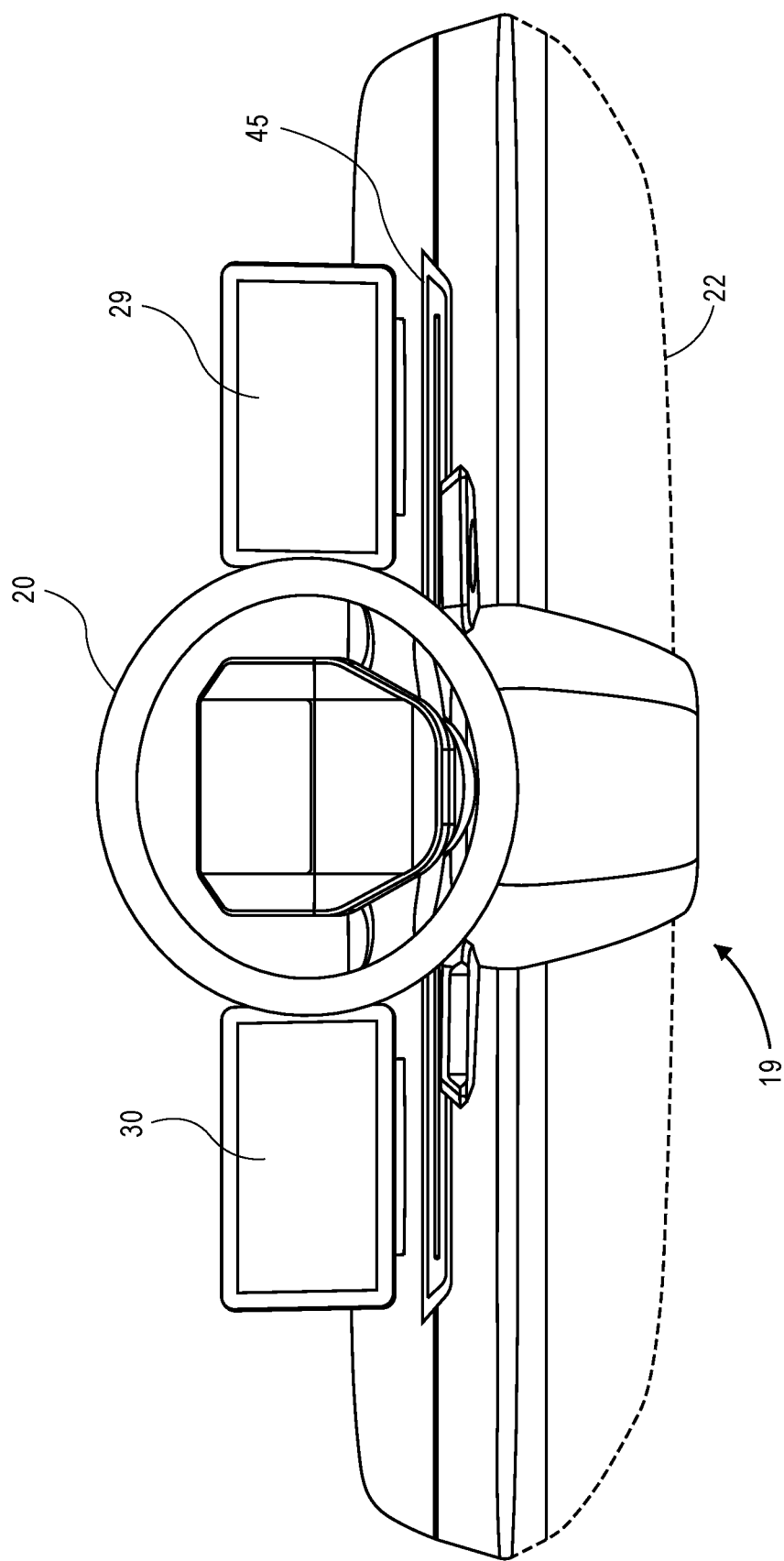

SLIDING CENTER MODULE SYSTEM FOR VEHICLE

FIELD

This disclosure relates to vehicles, such as cars, sports utility vehicles, and trucks, that include a seat for a driver. More particularly, this disclosure relates to a sliding center module that includes a driver's seat and a driver's control assembly.

BACKGROUND

Conventional vehicles include a driver seat that is fixed laterally in a front row of the interior of the vehicle and a passenger seat that is also fixed laterally in the front row. They are fixed laterally as they cannot be moved either left or right in the front row but they may be able to move longitudinally either towards the front of the vehicle or towards the back of the vehicle. Further, such vehicles often include a second row of seats that are behind the front row of seats. These seats in the second row can be referred to as rear seats, and they are also fixed laterally in the interior of the vehicle.

U.S. Pat. No. 2,858,877 describes a vehicle that is used for delivery of packages, and the driver seat can move independently of the vehicle's steering wheel (which remains stationary) to allow the driver to stop the vehicle and then move the seat (but not the steering wheel) from the left side to the right side of the vehicle in order to deliver a package. The vehicle described in this patent does not allow for different driving positions.

While U.S. Pat. No. 6,991,060 describes a vehicle that does allow different driving positions, the vehicle in that patent uses a complicated rotating carousel and rotating seats that will be difficult to manufacture and will probably have safety and reliability problems. The vehicle described in U.S. Pat. No. 6,991,060 does not have a driver seat and a steering wheel that move laterally across a front row of the vehicle.

US patent publication number 2017/0267126 describes a vehicle seat that can be moved laterally but that publication does not describe a vehicle that allows different driving positions.

PCT publication 2017/157838 also describes a driver seat that rotates on a rotating platform to allow a passenger to enter, but this publication does not describe a driver seat that allows for different driving positions.

US patent publication number 2006/0220411 describes a seat with a rail system that allows the seat to slide laterally within the vehicle, but this vehicle does not have multiple driving positions which are different.

Recently, the car company Audi AG of Ingolstadt, Germany revealed a concept car (PB18 e-tron) which has a driver seat which can slide in the first row of the vehicle, but this vehicle does not include rear seats and the driving position is limited to only one position in the car.

SUMMARY OF THE DESCRIPTION

A vehicle in one embodiment described herein includes a driver module which can include a driver seat and a driver control assembly both of which are movable along a front row of the interior of the vehicle to allow the driver module to move between a center position and at least one of a left position and a right position along the front row of the vehicle to allow the driver to have different driving positions in the vehicle. For one embodiment, the driver control assembly includes a steering wheel, a brake pedal, and an accelerator pedal. For one embodiment, the driver can drive the vehicle in any one of these three positions. For an alternative embodiment, the vehicle may support more than three positions for driving of the vehicle. The vehicle can further include a first rear seat and a second rear seat which are coupled to the chassis of the vehicle in a second row, behind the front row, in the interior of the vehicle. The passengers in the rear seats can extend their legs into the first row when the driver seat is in the center position. The driver seat and the driver control assembly are movable laterally along a set of rails coupled to the chassis of the vehicle.

For one embodiment, the driver control assembly is movable laterally along a dashboard that is in front of the front (first) row in the vehicle. The driver control assembly includes a surface that is adjacent to the dashboard and conforms to the shape of the dashboard. For one embodiment, there is no passenger seat in the front row of the vehicle. The driver seat and the driver control assembly are movable laterally along a set of rails which are coupled to the chassis of the vehicle. The driver seat and the driver control assembly are mechanically coupled together so that they move laterally together when moving between the two or three different positions such as the left position, the center position and the right position. For an alternative embodiment, the driver seat and the driver control assembly move separately when they laterally move between the different positions. For one embodiment, the first rear seat and the second rear seat can each be rotated, within the second row, away from a longitudinal centerline of the vehicle. This rotation can facilitate egress from and ingress into the vehicle for passengers riding in the rear seats of the vehicle. The drive control assembly can use drive by wire connections for steering, braking, and acceleration control of the vehicle. The drive by wire connections can be provided by a set of rails and a corresponding set of brushes or other conductive contact elements that provide ohmic connections. For an alternative embodiment, the drive by wire connections can be provided by capacitive connections or optical connections or inductive connections or radio frequency connections (wireless) or a combination of such connections which can provide redundancy. For an embodiment, each of the driver seat and the driver control assembly can lock into one of the three positions when the vehicle is not in park mode such that when the vehicle is not in park mode, neither the driver seat nor the driver control assembly can be moved. For an alternative embodiment, when the vehicle is operating in fully autonomous driving mode (such that the vehicle is operating/driving itself without requiring control or interaction by a driver), the driver seat and/or the control assembly can move while the vehicle is in drive mode or reverse mode or neutral mode; when the vehicle switches out of fully autonomous driving mode, the vehicle can require that it be in park mode before allowing the driver seat and the control assembly to move along the front row. In a general alternative embodiment, the vehicle can use a set of rules that determine when the driver seat and the control assembly can be moved based upon inputs such as status of the vehicle's autonomous driving system, status of the rear seats (e.g. occupied or not) and status of the vehicle's "transmission" (park, drive, neutral, reverse), etc.

For one embodiment, the vehicle can also include a first set of one or more sensors to sense a passenger in the first rear seat, and a second set of one or more sensors to sense a passenger in the second rear seat, and a set of one or more motors coupled to the driver seat and to the driver control assembly to laterally move the driver seat and the driver control assembly. Moreover the vehicle can include a data processing system that is coupled to the set of one or more motors and coupled to the first set and the second set of sensors and coupled to receive a vehicle drive mode signal that indicates whether the vehicle is in the park mode. The data processing system can prevent movement of the driver's seat even when the vehicle is in the park mode when a passenger is sensed in either of the first rear seat or the second rear seat by either of the first set of one or more sensors or the second set of one or more sensors. The first set of sensors can include a first load sensor in the first rear seat and optionally a first camera to acquire images of the first rear seat, and the second set of one or more sensors can include a second load sensor in the second rear seat and optionally a second camera to acquire images of the second rear seat. For an embodiment, the load sensors can be used to sense rear seat passengers without any use of images from camera(s). If cameras are used, pattern recognition techniques that recognize human or pet figures can be used to confirm a conclusion based on outputs from the load servers. For an embodiment, if either the load sensor for a seat or a camera for the seat indicates an occupant is in the seat, the system will prevent movement. Allowing either sensor to prevent movement can improve the safety of the system and prevent harm to passengers.

For one embodiment, the vehicle can include a dashboard that includes a set of one or more displays, such as one or more touchscreens or other types of displays on the dashboard such as a single display that spans substantially the entire dashboard (which can be referred to as a "coast-to-coast" display). The content displayed on the set of one or more displays on the dashboard can be based in part on the position of the driver seat. For example, driving critical information (for example, a digital instrument cluster that includes speed information, fuel/battery level, etc.) may always be displayed directly in front of the driver, whether the driver's seat is in the center, left or right position. For another example, the left display may display one type of information when the driver seat is in front of the left display and another type of information when the driver seat is in the right position along the first row of the vehicle. The driver seat is directly accessible in the interior of the vehicle without opening a door that is inside of the vehicle in the interior of the vehicle. For one embodiment, the driver seat includes a seatbelt that originates on and terminates on the driver's seat. For one embodiment, the driver seat includes a seatbelt that has both a lap portion and a shoulder portion both of which originate on and terminate on the driver seat.

The methods and vehicles described herein can include non-transitory machine readable media that store executable computer program instructions that can cause one or more data processing systems to perform the one or more methods described herein when the computer program instructions are executed. The vehicles described herein can be powered by internal combustion engines (e.g. gasoline or diesel powered engines) or electric motors (e.g. battery-powered electric motors) or hybrid systems that include internal combustion engines and electric motors or other types of engines or sources of energy. This summary does not include an exhaustive list of all embodiments in this disclosure. The vehicles and methods described herein can be practiced from all suitable combinations of the various aspects and embodiments summarized above and also those disclosed in the detailed description below.

All systems and methods can be practiced from all suitable combinations of the various aspects and embodiments summarized above, and also those disclosed in the Detailed Description below.

BRIEF DESCRIPTION OF THE DRAWINGS

The present embodiments are illustrated by way of example and not limitation in the figures of the accompanying drawings in which like references indicate similar elements.

FIG. 7 is a front view of the dashboard and the driver control assembly, where the dashboard includes two displays.

DETAILED DESCRIPTION

Figure 1:
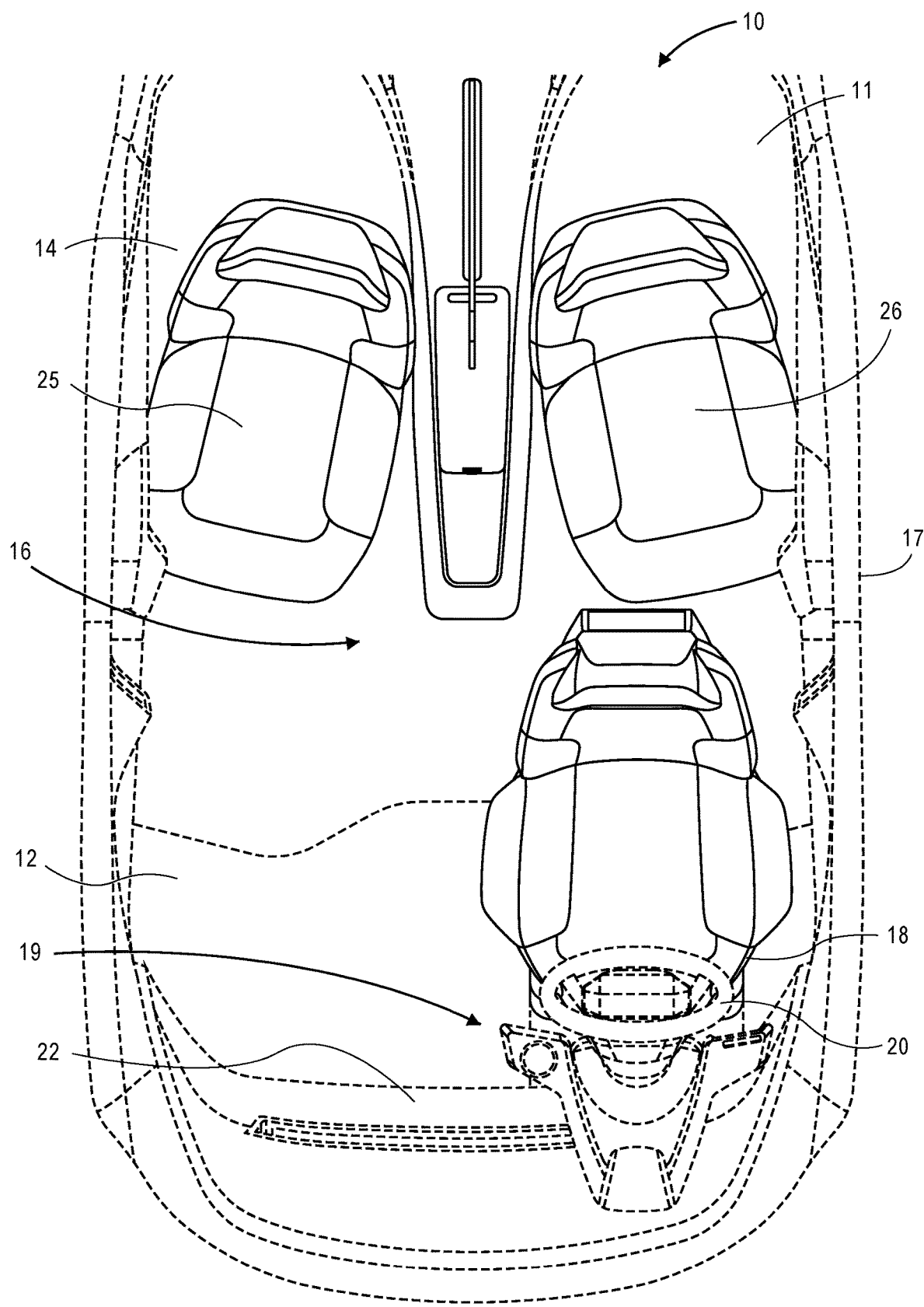
FIG. 1 is a top view of a vehicle interior which includes a driver seat and two rear passenger seats, with the driver seat in the left driving position along the front row of the vehicle.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrases "in one embodiment" or "for one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

FIGS. 1, 2, 3, and 4 show an example of the interior of a vehicle which includes a driver seat and a driver control assembly that can be moved laterally along the front row of the vehicle to enable at least three different driving positions which can include a left driving position, a center driving position, and a right driving position. In an alternative embodiment, the vehicle shown in FIGS. 1, 2, 3, and 4 can enable at least two different driving positions such as the center driving position and the left driving position.

Advantages of having the driver seat and driver control assembly moving laterally can include increased storage capacity, increased leg room, the ability of a single car to operate in different countries and regions that drive on different sides of the road (e.g., Hong Kong and Mainland China), a shorter overall length of the vehicle and reduced weight of the vehicle.

As shown in FIGS. 1, 2, 3, and 4, the vehicle interior 16 includes a driver seat 18 and a right rear seat 25 and a left rear seat 26. The driver seat 18 is positioned in the first or front row 12 of the vehicle interior 16 and the rear seats 25 and 26 are positioned in the second row 14 of the interior 16 of the vehicle 10. The interior 16 is attached to a chassis 11 of the vehicle. The vehicle 10 can include a set of doors such as the door 17 which can allow egress from and ingress into the vehicle.

The vehicle 10 also includes a driver control assembly 19 which can include a steering wheel 20 and a set of other driver controls such as an accelerator pedal and a braking pedal. For one embodiment, the driver control assembly 19 slides along the dashboard 22 as the driver control assembly moves between the different positions. In one embodiment, the driver control assembly 19 can be mechanically coupled to the driver seat 18 such that they move as a single unit when the driver module is moved between the three positions shown in FIGS. 1 through 4. In an alternative embodiment, the driver control assembly 19 and the driver seat 18 can be on different frames or platforms and move separately as the two components move between the different positions as shown in FIGS. 1 through 4.

Figure 2:
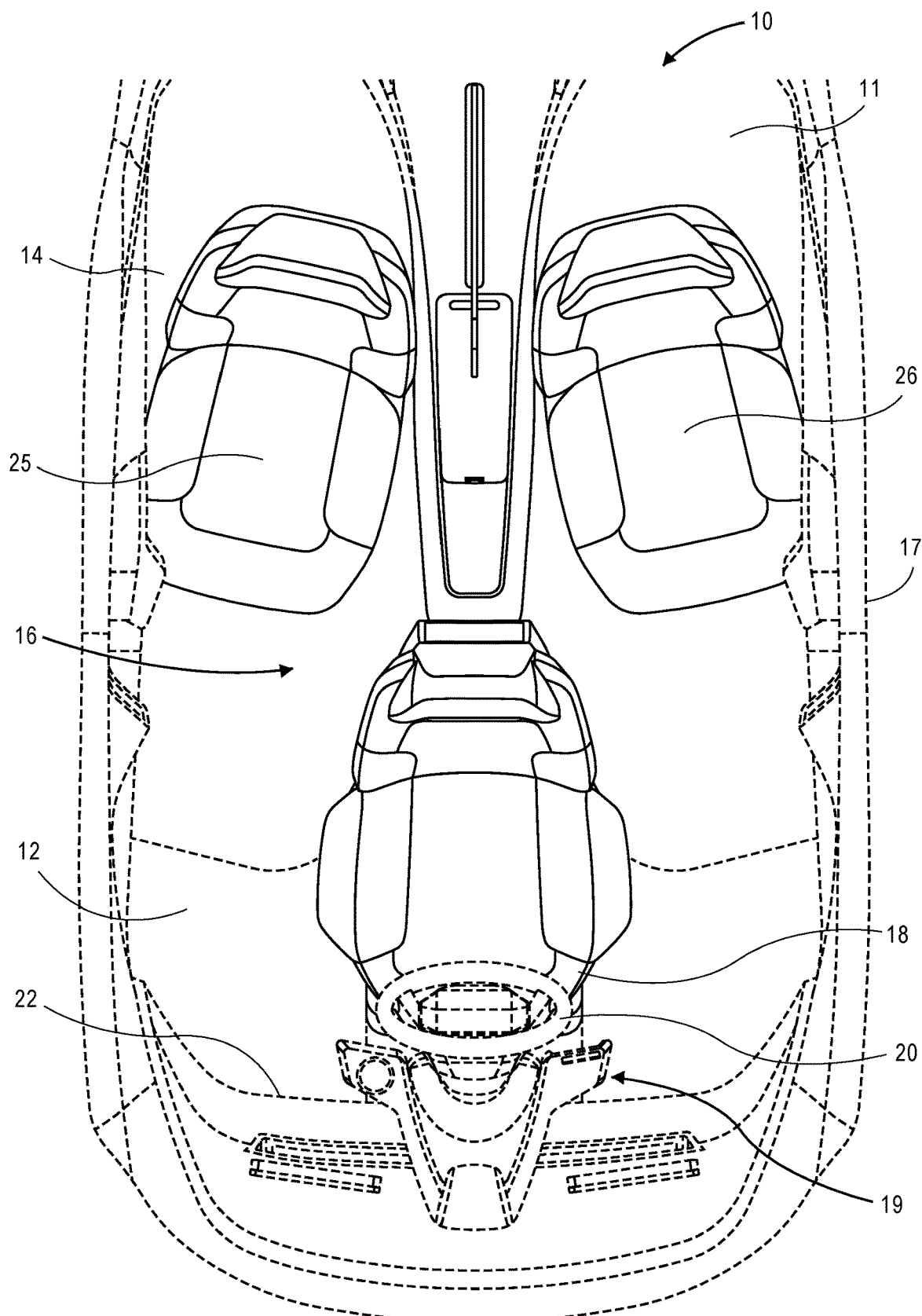
FIG. 2 is a top view of the vehicle interior shown in FIG. 1 with the driver seat in the center driving position along the front row of the vehicle.
Figure 3:
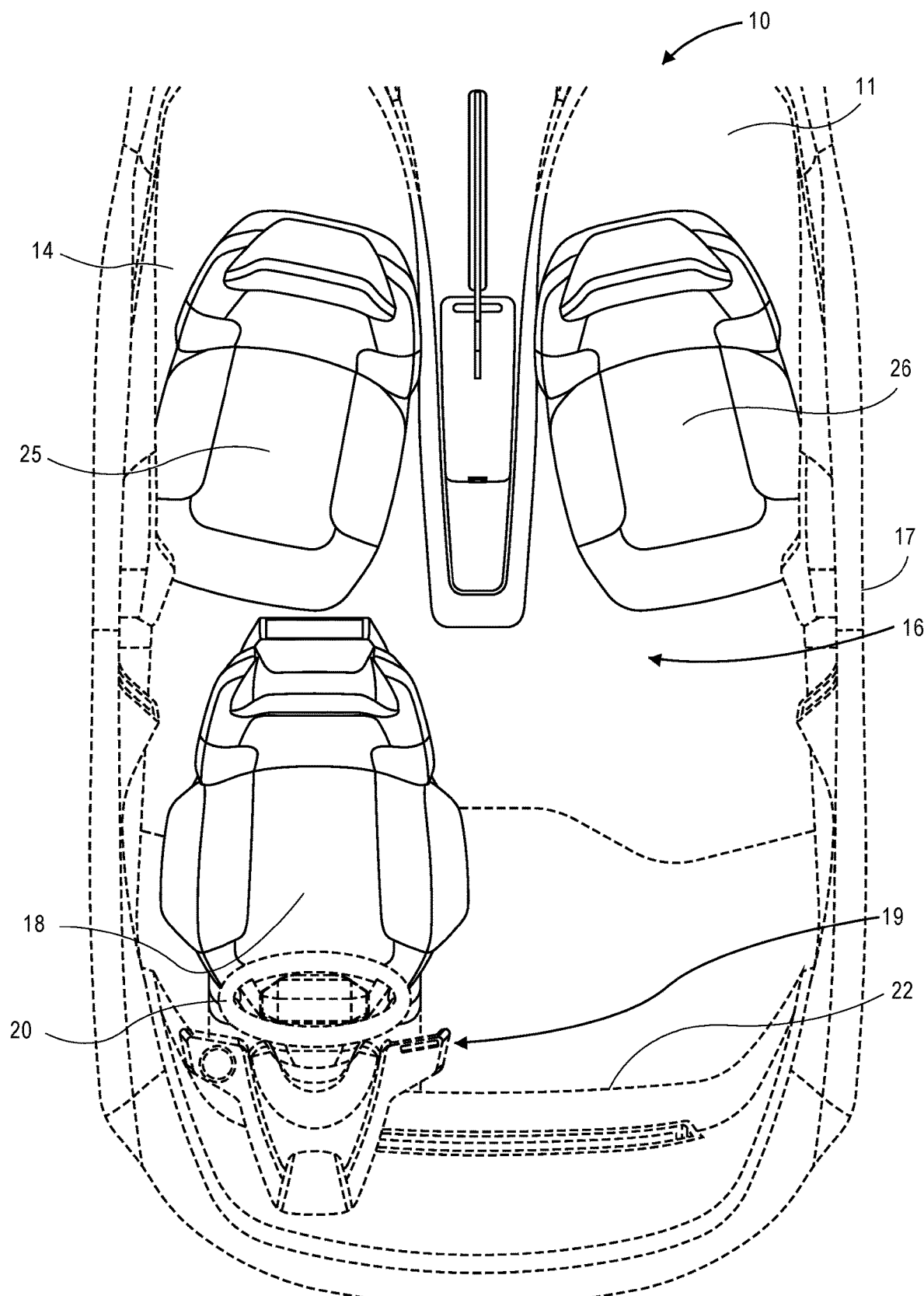
FIG. 3 is a top view of the vehicle interior shown in FIG. 1 with the driver seat in the left driving position along the front row of the vehicle.
Figure 4:
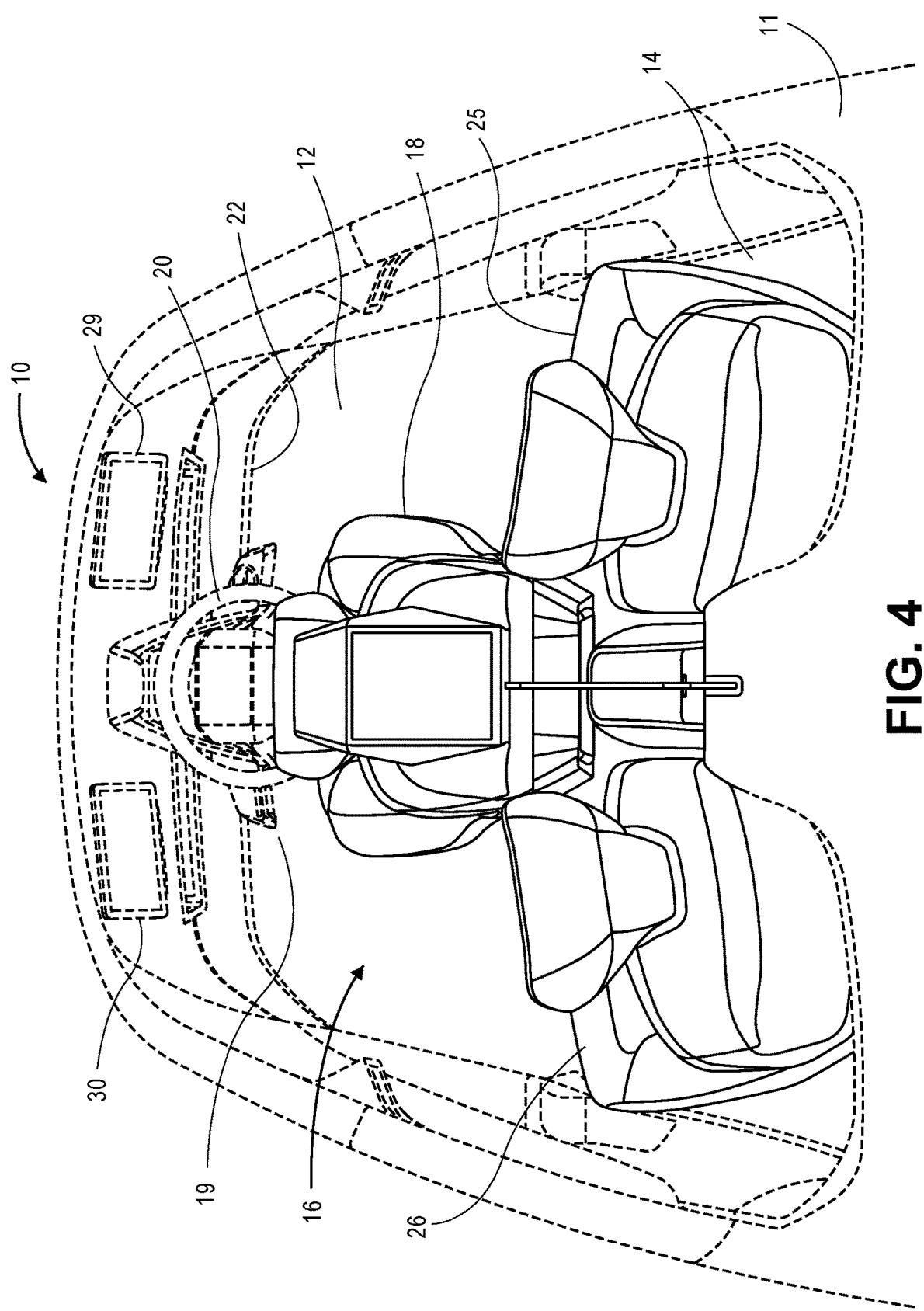
FIG. 4 is a rear perspective view of the vehicle interior shown in FIG. 1 with the driver seat in the center driving position along the front row of the vehicle; the view shown in FIG. 4 shows the legroom which is available for the passengers when they sit in the rear passenger seats.

As shown in FIGS. 2 and 4, when the driver seat 18 is in the center position, the passengers in the rear seats have considerable extra leg room or room to put luggage, pets, packages, etc. Also as shown in FIGS. 1 through 4, when the driver seat is not in the center position, there is very little legroom for a passenger in the passenger seat that is immediately behind the driver seat (or insufficient leg room for an adult). Insufficient leg room can be less than about 4 or 5 inches. Thus, when two passengers are in the vehicle, it may be highly desirable to have the driver seat in the center position; on the other hand, when there is only one passenger in the vehicle, the driving position can be either the left position or the right position depending on where the passenger is sitting. For example, if the passenger is sitting in the left rear passenger seat then the driver seat should be placed in the right driving position; if the passenger is sitting in the right rear passenger seat, then the driver position should be placed in the left driving position. For one embodiment, the vehicle 10 can be a taxi or ridesharing vehicle and the taxi driver sits in the driver seat 18 while the passengers who pay for the taxi ride or ridesharing ride sit in one or more of the rear seats. For another embodiment, the vehicle can be a delivery vehicle. For a delivery vehicle, the sliding driver seat 18 and driver control assembly 19 allows for extra space for package storage. For example, when the driver seat 18 and assembly 19 are in the center position, there is space for packages to the left or right of the driver seat 18. When the driver seat 18 and assembly 19 are at left or right positions, there is a respective large space to the side of the driver seat 18.

As is described further below, in one embodiment the driver seat can be moved when the vehicle is stopped and placed in a park mode, and in one embodiment the driver seat is prevented from being moved when the vehicle is not in the park (P) mode such as a neutral (N) mode or drive (D) mode or reverse (R) mode. For one embodiment, a set of rules can be used to determine whether to allow movement of the driver seat based on one or more of: "transmission" mode (park, neutral, drive, reverse) of vehicle; autonomous driving mode of the vehicle (fully autonomous driving mode or not fully autonomous mode); and presence of one or more passengers in the rear seats.

The use of sliding driver seat 18 and control assembly 19, in one embodiment, allows vehicle 10 to be shorter in length given that having the driver seat 18 and control assembly 19 in the center position gives the rear passengers extra leg room. This allows the distance of the driver seat 18 to be close to the rear seats 25 and 26 in the front to back direction (e.g., the distance between the rear of the front driver seat and the front edge of a rear seat can be less than about 4 to 5 inches). Having a shorter vehicle 10 has numerous advantages such as reduced weight, better fuel economy or battery range, better maneuverability, increased ease of parking, more storage space or lower cost of production due to fewer raw materials or a combination of these advantages.

In the examples shown in FIGS. 1 through 4, the rear passenger seats are rotated, within the second row, away from a longitudinal centerline of the vehicle. In one embodiment, the rear passenger seats can be individually rotated such that they can be rotated away from the longitudinal centerline or they are rotated to be parallel with the longitudinal centerline of the vehicle. In one embodiment, the rear seats can be rotated away from the centerline by as much as about 10 to 30 degrees; the angle of rotation can be adjustable in one embodiment through a range of zero degrees (no rotation, seats are parallel with the centerline) or up to the maximum amount of rotation. For one embodiment, the rear seats can be implemented as described in U.S. Patent Application No. 62/732,933, filed Sep. 18, 2018, entitled "Rotating Vehicle Seat" by applicants Christopher Eckert, et al., and this application is incorporated herein by reference.

Figure 5:
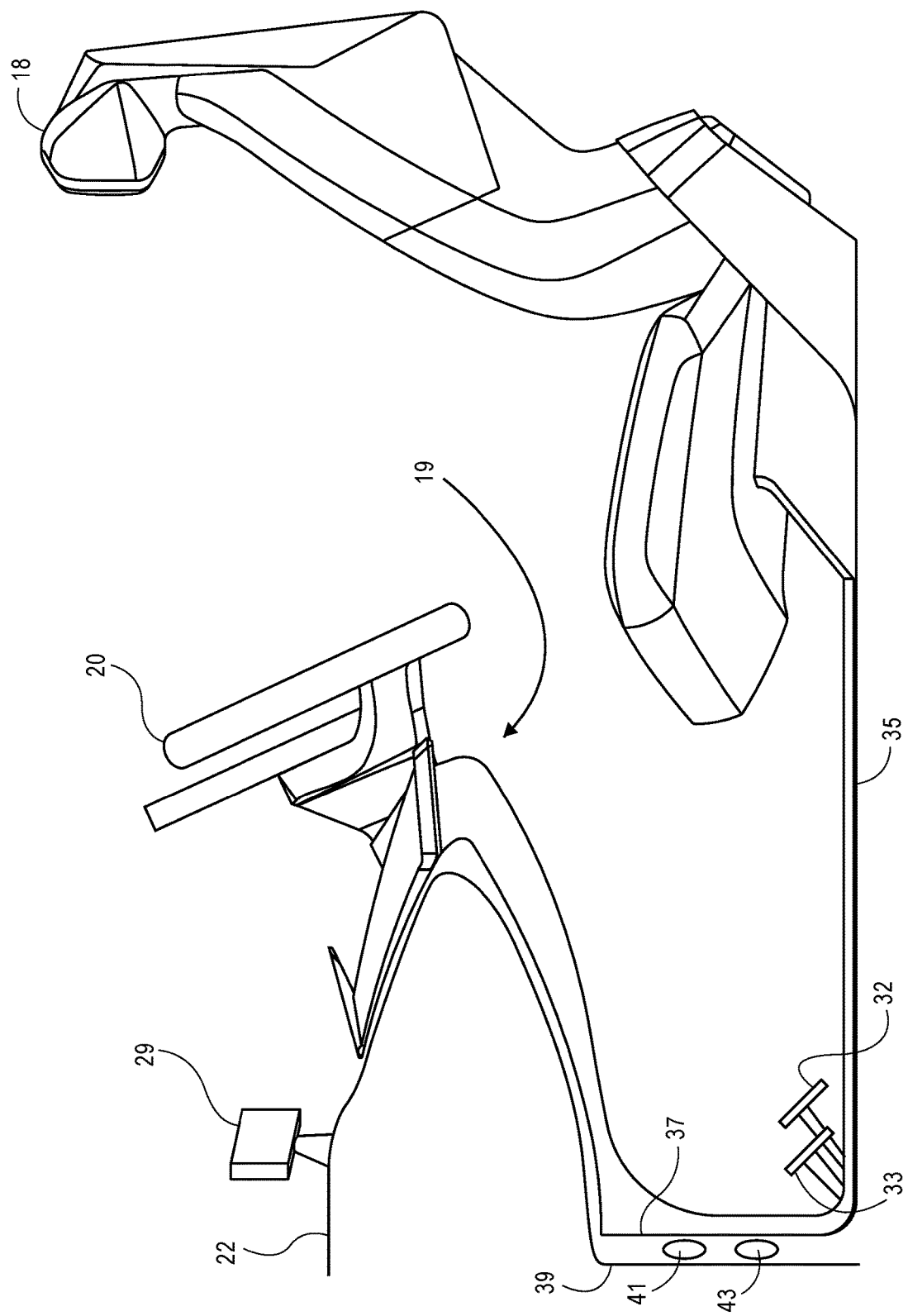
FIG. 5 is a side view of a driver module which includes the driver seat and the driver control assembly which can be attached to the same frame and move together laterally along the front row of the vehicle.

An example of an integrated driver module which includes both the driver seat and the driver control assembly is shown in FIG. 5. In the example of FIG. 5, the driver seat 18 and the driver control assembly 19 are attached to a driver module frame 35 which holds both the driver seat 18 and the driver control assembly 19 and causes both components to be moved together between different positions as shown, for example in FIGS. 1, 2, 3, and 4. The driver module frame 35 can include wheels or other mechanisms that can link to rails that are coupled to the chassis of the vehicle to allow the driver module to slide laterally along the first row of the interior of the vehicle between different driving positions such as the left driving position and the center driving position.

Figure 6:
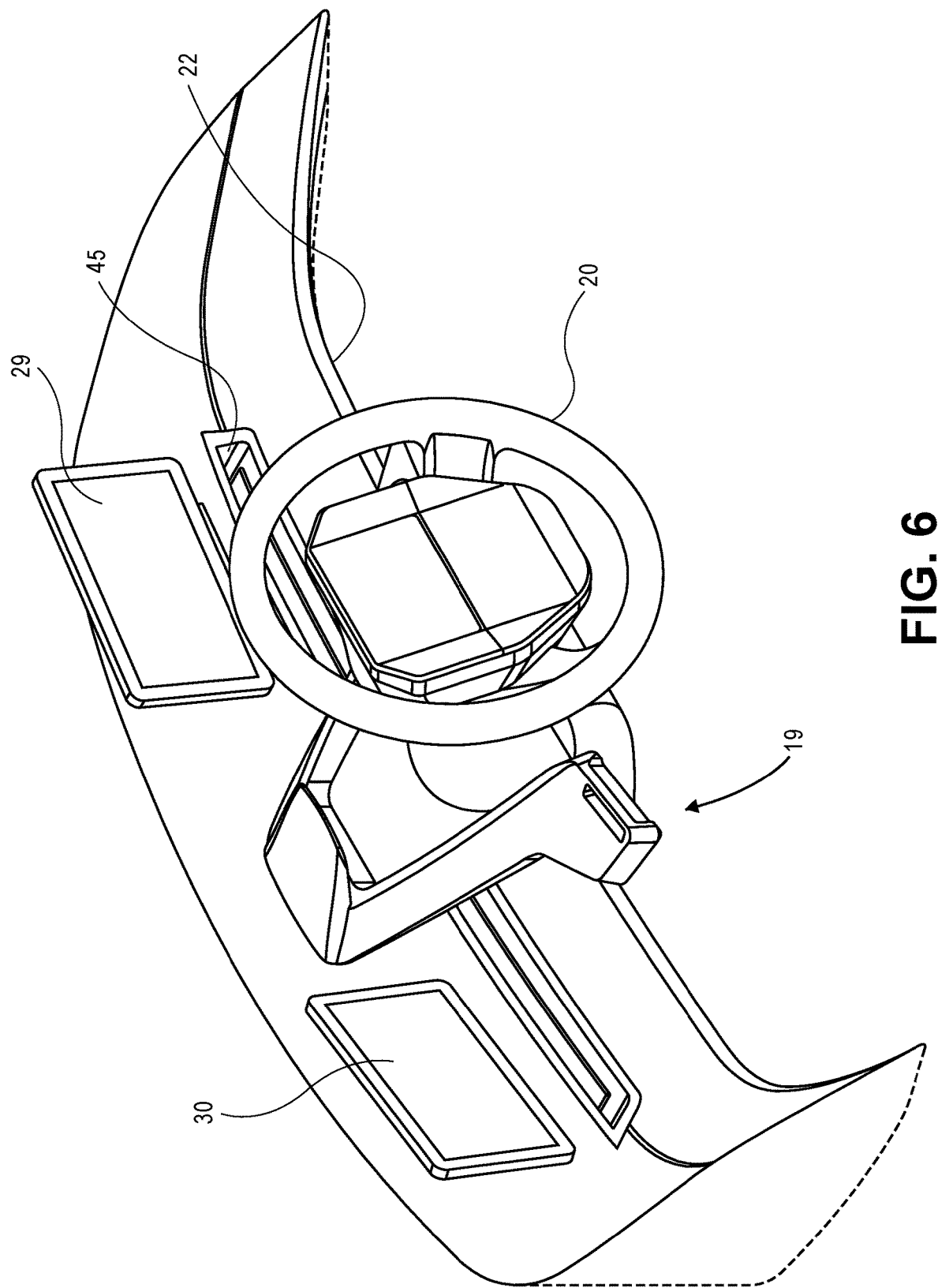
FIG. 6 is a perspective view of the driver control assembly which can slide along the dashboard which can include two displays on the dashboard.

The driver control assembly 19 includes a steering wheel 20 and an accelerator pedal 32 and a brake pedal 35. As shown in the side view of FIG. 5, the driver control assembly 19 fits and confirms around the dashboard 22 and slides along the dashboard as the driver module shown in FIG. 5 moves between the different driving positions such as the different driving positions shown in FIGS. 1 through 4. The dashboard 22 includes one or more displays such as the display 29 which is also shown in FIGS. 6 and 7 which show perspective and front views respectively of the dashboard 22. For one embodiment, the dashboard 22 can include a "coast-to-coast" display that substantially spans, in a left to right direction, the dashboard. The content on the one or more displays can change based upon the position of the driver seat in one embodiment. For one embodiment, critical information about the vehicle and driving conditions, such as the current speed of the vehicle, fuel and/or battery level of the vehicle, the "transmission" mode (e.g., P, N, D, R) of the vehicle, and other information, may always be displayed directly in front of the driver, whether the driver's seat is in one of various different positions (such as a left, center or right position). When the driving critical information is directly in front of the driver seat, the driver can look straight ahead to see the driving critical information rather than looking to the left or to the right.

A lower portion of the dashboard 22 includes a wall 39 that is proximate to the wall 37 formed at the front portion of the driver control assembly 19. For one embodiment, drive-by-wire connections 41 and 43 are provided between the wall 39 and the wall 37 to allow drive by wire functionality for steering, braking, and acceleration control of the vehicle. For one embodiment, each of the drive-by-wire connections can be a combination of a rail and a corresponding brush that makes an ohmic contact between an electrical component in the driver control assembly and another electrical component in the vehicle. Drive-by-wire connections are known in the art and any one of the available drive-by-wire connections that are known in the art can be used in one or more embodiments described herein. For one embodiment, the connections can be optical connections or capacitive connections or inductive connections or wireless connections rather than ohmic connections. For one embodiment, the drive-by-wire connections can include a primary connection and a secondary connection which is redundant for the primary connection for each of the controls; for example, the steering control can have a primary ohmic connection and a secondary connection can be an optical connection or a wireless connection or another ohmic connection FIGS. 6 and 7 show an example of a dashboard which is in close proximity to and conforms to the shape of at least a portion of the driver control assembly 19 which includes the steering wheel 20. For one embodiment, the driver control assembly 19 slides along the dashboard 20 which includes air vents 45 and one or more displays, such as display 29 and display 30. For one embodiment, the content on the displays 29 and 30 depend upon the driving position of the driver seat. For example, display 29 may display one type of content when the driver seat is in the right driving position and may display different content when the driver seat is in the left driving position or the center driving position. In the case of a "coast-to-coast" display, the content of such display may shift based on the driver seat's position to, for example, ensure that driver critical information is directly in front of the driver seat. The different driving positions are determined by a data processing system that in turn determines what to display on the different displays on the dashboard.

There are various different ways to move the driver seat and the driver control assembly. For example they can be moved together on the same frame or separately on different frames. They can be moved at the same time when they are on the same frame or even when they are on different frames; alternatively, when they are on different frames they can be moved at different times (e.g., move the driver control assembly first then move the driver seat). Moreover, the mechanisms that cause the movement can vary and include one or more motors that move the one or more frames that hold the seat and control assembly, and the frames can be moved by motorized wheels on the frames that roll against a set of rails that are configured to support the seat and control assembly (or just one of the seat or control assembly when the seat and the control assembly move separated).

Figure 8A:
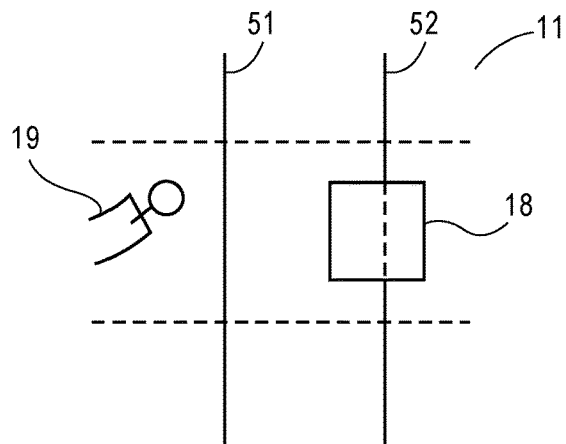
FIG. 8A shows an example of a set of rails which can be used to move a driver module which can include both the driver control assembly and the driver seat.
Figure 8B:
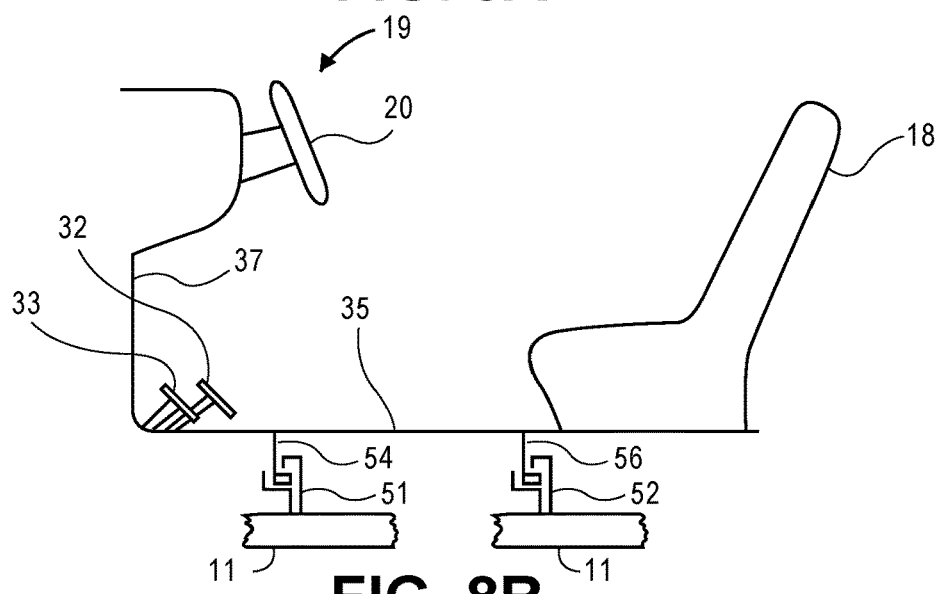
FIG. 8B shows a side view of a driver module which can be moved on a set of rails that are coupled to the chassis of the vehicle.
Figure 9:
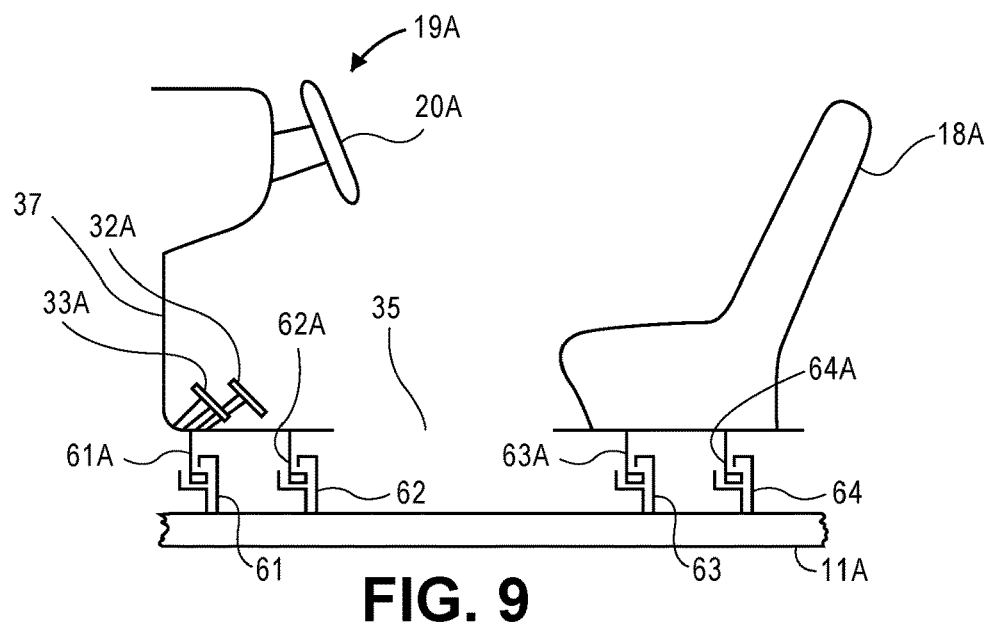
FIG. 9 shows an alternative embodiment where the driver control assembly and the driver seat are moved separately on separate sets of rails according to one embodiment.

FIGS. 8A, 8B, and 9 provide examples of how the driver seat and the driver control assembly can be moved mechanically in various embodiments. In the example shown in FIG. 8A, the driver seat 18 and the driver control assembly 19 can be coupled together on a platform or frame such as the driver module frame 35 and moved by motors that move the driver module frame through wheels that are coupled to a set of rails such as the rails 51 and 52 which are coupled to the chassis of the vehicle 10. FIG. 8A shows a top view above the rails 51 and 52. In the example shown in FIG. 8A, the rails 51 and 52 are linear rails that are mounted or coupled to the chassis 11 and which allow a platform or frame holding the driver seat 18 and the driver control assembly 19 to move laterally along the first row of the vehicle. In an alternative embodiment, the rails 51 and 52 can be curved along an arc in the first row allowing the frame holding the driver seat 18 and the driver control assembly 19 to be moved generally laterally along the arc in the first (front) row.

FIG. 8B shows an example of how a platform or frame, such as the driver module frame 35 can be coupled to the chassis 11 through a set of one or more rails, such as the rails 51 and 52 to allow the driver module frame 35 to move laterally along the first row to thereby laterally move the driver seat 18 and the driver control assembly 19. In the example shown in FIG. 8B, a set of one or more wheel assemblies, such as wheel assemblies 54 and 56 can engage a set of rails, such as the rails 51 and 52 which are coupled to the chassis 11 of the vehicle 10. The rails, such as rails 51 and 52 can be configured or designed to engage the wheels, such as wheel mechanisms 54 and 56, on the driver module frame 35 to allow the seat and the driver control assembly to slide or roll laterally along the first row of the vehicle when a driver desires to change the position of the driver seat.

FIG. 9 shows an alternative embodiment in which the driver control assembly and the driver seat are on different frames or platforms and move separately and independently. In one embodiment, both the driver control assembly and the driver seat move separately but to the same position commanded by a command from the driver when the driver desires to change the driving position of the driver seat. In the example shown in FIG. 9, the seat 18A is mounted on a frame that includes wheel mechanisms 63A and 64A which engage rails 63 and 64 to allow the seat 18A to move laterally along the first row of a vehicle. Similarly, the driver assembly column or assembly 19A, which includes steering wheel 20A and accelerator pedal 32A and brake pedal 33A, includes wheel mechanisms 61A and 62A which engage rails 61 and 62 to allow the driver control assembly 19A to move laterally along the first row of the vehicle on the rails 61 and 62 which are coupled to the chassis 11A of the vehicle. It will be appreciated that the rails, such as rails 61 and 62, can take a variety of different physical forms, shapes and configurations and can be configured to engage different types of wheels or other movement mechanisms that are coupled to one or more frames holding the driver control assembly and the driver seat. The rails 61 and 62 can be in the shape of a line or an arc to allow generally lateral movement of the driver seat along the front row of the vehicle. It will also be appreciated that a set of one or more motors that propel the wheels can be coupled to one or more data processing systems as described below to allow the frame or set of frames to move under the control of a data processing system that control the set of one or more motors. In one embodiment, the movement can be controlled through a set of one or more position encoders which determine the position of the driver control assembly and the driver seat as they move based upon markers or other data sensed by one or more position encoders that are known in the art. The assemblies and the rails can include one or more locking mechanisms that securely lock the wheels to the rails at a driving position once a move to a new position is completed, and these locking mechanisms can also be used to lock, in one embodiment the driver seat and the driver control assembly when the vehicle is not in the park mode. When the driver seat is locked can depend upon a set of rules related a "transmission" state of the vehicle, a passenger state of the vehicle, and an autonomous driving mode of the vehicle in one embodiment.

Figure 10:
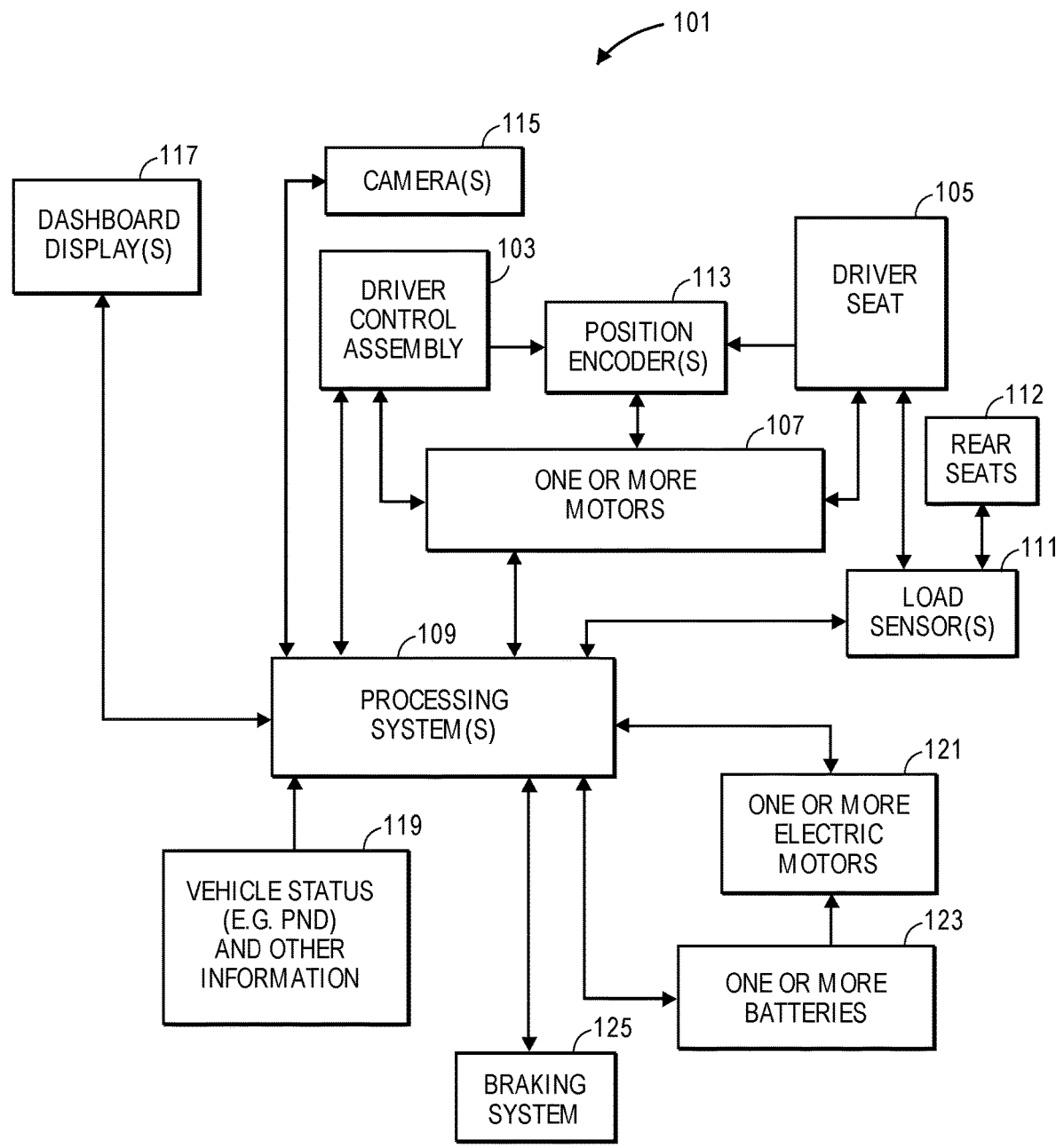
FIG. 10 shows an example of a system for controlling the movement of the driver control assembly and the driver seat according to one embodiment.

FIG. 10 shows an example of a system in a vehicle that includes movable components such as a movable driver seat and a movable driver control assembly. In the system 101 shown in FIG. 10, one or more motors 107 move the driver control assembly 103 and the driver seat 105 based upon data from one or more position encoders 113 which monitor the position of the driver control assembly 103 and the driver seat 105. In one embodiment, the driver control assembly 103 can be the same as the driver control assembly 19 and the driver seat 105 can be the same as driver seat 18. The one or more motors 107 can be controlled by one or more data processing systems, such as the data processing system 109 which is coupled to the one or more motors 107. Information about the position of the driver control assembly 103 and the driver seat 105 can be dynamically obtained from the position encoders 113 and provided to the data processing system 109. Position encoders 113 can be a set of conventional position encoders that motion control systems use on, for example, wafer probers or astronomical telescope mounts to determine the relative position of two or more components as one moves relative to the other, and they can include optical sensors and markers or other known position encoding mechanisms to enable a data processing system to ascertain the relative position of objects during and/or after movement of at least one of the objects.

The movement of the driver control assembly 103 and the driver seat 105 can occur concurrently when the driver control assembly 103 and the driver seat 105 are coupled mechanically together such as the example shown in FIG. 5 in which the driver module 35 mechanically couples together the driver control assembly 19 and the driver seat 18. For an alternative embodiment, when the driver control assembly 103 and the driver seat 105 are on different platforms or frames and move independently and separately, the position encoders 113 can determine the proper position of each component such as a driver control assembly 103 and the driver seat 105 during and after a move to make sure the components are in the proper position such as the left driving position or the right driving position or the center driving position based upon data provided by the one or more position encoders 113. The one or more motors 107, can be controlled by the data processing system 109 to make sure that the driver seat can be moved based upon the condition of the vehicle (e.g. transmission mode such as P, N, D, R, and autonomous driving mode, etc.) and the presence or absence of passengers in the vehicle. This is described further below in conjunction with FIG. 11 which shows an embodiment in which the data processing system, such as data processing system 109 allows movement (if the vehicle is not in fully autonomous driving mode) when the vehicle is in the park mode and when there are no passengers in the rear seats of the vehicle. The presence or absence of passengers can be determined based upon load sensors or alternatively a combination of load sensors and cameras, such as one or more load sensors 111 and one or more cameras 115 as shown in FIG. 10. The one or more cameras 115 can be coupled to the data processing system 109 to provide images of the rear seats in the vehicle, and the one or more load sensors 111 can provide information about whether a passenger is sitting in or otherwise making contact with one or more rear passenger seats. Based upon data from the one or more cameras 115 or from the one or more load sensors 111 or from both, the data processing system 109 can make a decision about whether or not to allow movement of the driver seat as described further below. For one embodiment, the data processing system 109 can use known image processing methods to recognize human or pet forms (in images of the rear seats captured by the cameras) based on pattern recognition and motion detection relative to known patterns on an empty seat when load sensors persistently indicate the seat is empty (not occupied); in other words, the images captured by the cameras when the load sensors indicate that the seats are empty can be used as reference images that are compared against images that contain recognized human or pet forms. When the load sensor(s) indicate an occupied seat and the data processing system's recognition of a human or pet form also indicate an occupied rear seat, the system can decide to prevent movement. For one embodiment, when either the load sensor under a seat or a camera capturing images of the seat indicate the seat is occupied, the data processing system can prevent movement of the driver seat. Thus, in one embodiment, an indication of occupancy from either the camera or the load sensor can block movement of the driver's seat.

In addition, the processing system 109 can be coupled to one or more dashboard displays 117 which can be for example the displays 29 and 30 shown for example in FIG. 6. The content of these dashboard displays can be based at least in part upon the position of the driver seat as described herein. For example, driving critical information (such as, for example, a digital instrument cluster that includes speed information, fuel/battery level(s), vehicle status or warning messages, etc.) may always be displayed directly in front of the driver seat, whether the driver seat is in the left, center or right positions. In the case of a "coast-to-coast" display along a dashboard, the content of the display can be shifted around to match the current position of the driver's seat as it moves laterally along the front row so that such driving critical information in one embodiment is always in front of the driver's seat regardless of the driver seat's position.

The processing system 109 can be further coupled to one or more sensors or other sources of data which provide a vehicle status and other information such as whether the vehicle is in park mode or neutral mode or drive mode or reverse mode as has been described herein. In particular, the processing system 109 can be coupled to a vehicle status source 119 which provides information about the status of the vehicle such as whether it is in park mode or neutral mode or drive mode or reverse mode and whether the vehicle is operating in fully autonomous driving mode. In one embodiment, the processing system 109 can also be coupled to one or more electric motors 121 which can be coupled to wheels that are coupled to the chassis of the vehicle to propel the vehicle. In one embodiment, these one or more electric motors 121 can be coupled to receive power from one or more electric batteries such as one or more batteries 123 which can also be coupled to the processing system 109 to provide information about the status of the one or more batteries 123. Moreover, the processing system 109 can be coupled to a braking system, such as braking system 125 which can provide information about the status of the vehicle such as whether the vehicle is in a park mode or a neutral mode or drive mode or fully autonomous driving mode.

Figure 11:
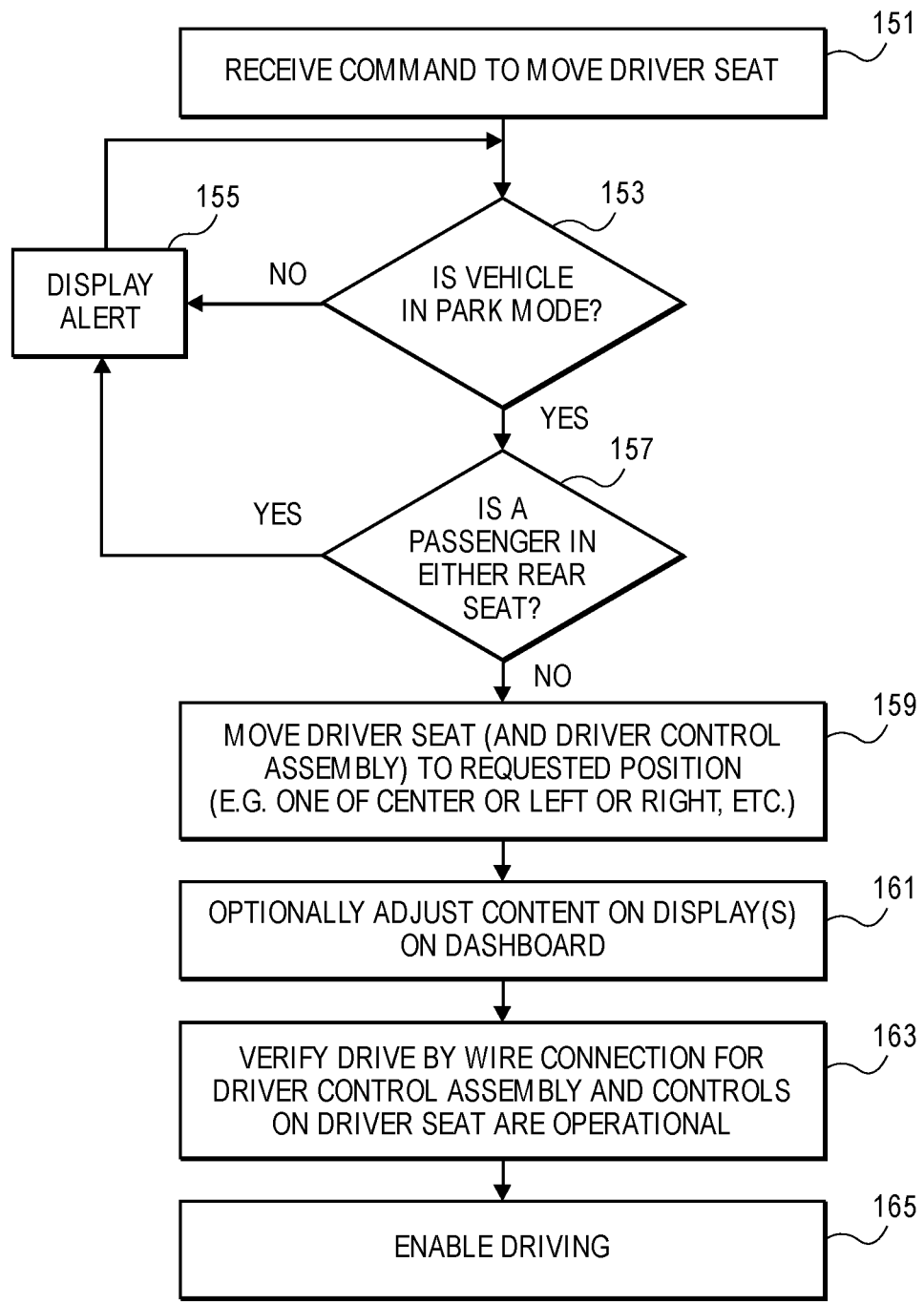
FIG. 11 is a flowchart which shows a method according to one embodiment for controlling the movement of the driver seat.

A method, according to one embodiment for operating a vehicle which is equipped or implemented as described herein is shown in FIG. 11. Alternative embodiments which can be used when the vehicle is capable of fully autonomous driving are described below. This method can be from performed with a vehicle which has two or more driving positions such as a center driving position and at least one of a left driving position and a right driving position (and which may be capable of fully autonomous driving). In the example shown in FIGS. 1, 2, and 3, the vehicle can be driven in any one of at least three driving positions such as the left, right, and center driving positions. At any one point in time, a driver can request the vehicle to change the driving position, and this can be the result of a command which is received from the driver. The command can be received from an input device on the vehicle (such as one of the displays 29 or 30) or from a touchscreen or smart phone or other device controlled by the driver and authenticated and approved for use by the vehicle. This is shown in operation 151 in FIG. 11. In response to receiving the command, the vehicle in one embodiment determines in operation 153 whether the vehicle is in the park mode. If the vehicle is in the neutral mode or in the drive mode or the reverse mode, it is not in the park mode and thus the vehicle will respond with an alert 155 which indicates to the driver that the vehicle needs to be placed into the park mode to allow the driver seat to be moved. This alert can be audible or a displayed alert or both. The driver can then place the vehicle into the park mode to allow the command to be processed. If the vehicle is in the park mode, then from operation 153 the system proceeds to operation 157 in which it is determined whether a passenger is in either rear seat. Operation 157 can be desirable in those embodiments in which there is insufficient space for an adult's legs (adult leg room) between the driver seat and either of the rear seats. If the system determines based upon, for example a load sensor and/or a camera, that there is a passenger in either seat, then the system displays an alert in operation 155 which indicates that the driver seat cannot be moved because there is a passenger in one of the rear seats. After the passenger exits from the rear seat and there are no passengers left in the rear seats, operation 157 can allow the method to proceed to operation 159. In operation 159, the vehicle moves the driver seat and also the driver control assembly to the requested position. This can for example be the center driving position or the left driving position or the right driving position in one embodiment, or in those embodiments which allow fewer or more driving positions it can be an alternative driving position. In operation 161, the vehicle can optionally adjust the content on the displays on the dashboard based upon the position of the driving seat. As explained herein, the content on the displays, such as the display 29 and the display 30 (or such as a coast-to-coast display that substantially spans the entire length of the dashboard) described herein can vary based upon the position of the driver seat. For example, if the driver seat is positioned in front of the left display such as the display 30, the content on the display 30 may change relative to what it was when the driver seat was in the right driving position. For example, the display which is in front of the driver seat may show the rearview of the vehicle while the other display may show views from the left and right side of the vehicle which resemble the views available from left and right side mirrors on a conventional car. In operation 163, the data processing system, such as data processing system 109 can verify whether the drive by wire connections for the driver control assembly are fully operational and whether the controls on the driver seat are also fully operational. For example, in operation 163, the data processing system can verify that each of the drive by wire connections for steering, braking, and acceleration are fully operational before allowing the vehicle to be driven by the driver. This verification can be done after moving each of the driver control assembly and the driver seat into the desired or requested position based upon the command received in operation 151. In one embodiment, only after verifying that the drive by wire connections are fully operational for each control component in the driver control assembly and the driver seat will the data processing system enable driving in operation 165 as shown in FIG. 11. It will be appreciated that operations 161 and 163 in one embodiment are optional operations which are provided for additional safety but in certain embodiments may not be required or desired.

An alternative embodiment of the method shown in FIG. 11 can be used if the vehicle is capable of fully autonomous driving in which a set of sensors and one or more data processing systems control the operation/driving of the vehicle and the occupants are not required to operate the gas and brake pedals and are not required to steer the vehicle. This alternative embodiment generally can use a set of rules that determine when the driver seat and the control assembly can be moved, and the set of rules can use a set of inputs that can determine, through the set of rules, when and how the driver seat and the control assembly can be moved. The set of inputs can include one or more of: (a) the vehicle's autonomous driving mode status (e.g. fully autonomous driving mode is enabled or not enabled); (b) the vehicle's "transmission" state (e.g., park, reverse, neutral, and drive); (c) if the rear seats are in close proximity to the driver seat, whether there are passengers in the rear seats; and (d) the status of drive by wire connections in the current and alternative positions of the driver seat (e.g. whether the alternative positions are capable of operating by providing acceptable connections based upon a prior assessment of those connections in the alternative positions). The set of rules can include the following: if the vehicle is not in fully autonomous driving mode, the "transmission" must be in park mode in order to allow movement of the driver seat but if the vehicle is in fully autonomous mode then movement is allowed unless prevented by other rules; if any one of the rear seats are occupied and if an occupied rear seat is in close proximity of the driver seat's requested new position, then movement is prevented until the seat is not occupied (and the other rules permit movement); if a requested position is known to provide an acceptable set of drive by wire connection, then movement is permitted unless prevented by other rules. A method in an alternative embodiment can receive a command to move the driver seat while the vehicle is driving in fully autonomous mode; in response to this command, the vehicle can move the driver seat to the requested position, even while the "transmission" is in drive or reverse mode, if no rear passengers will be effected by the requested move and if the new position can provide an acceptable drive by wire set of connections. If rear passengers will be effected or if the new position cannot provide acceptable connections, then the driver seat will not be moved. The driver can stop the vehicle and ask the passengers to exit to allow the driver seat to be moved if acceptable connections can be provided.

It will be apparent from this description that embodiments and aspects of the present invention may be embodied, at least in part, in software. That is, the techniques may be carried out in a set of one or more data processing systems in response to its processor(s) executing a sequence of instructions contained in a storage medium, such as a non-transitory machine-readable storage medium (e.g. volatile DRAM or non-volatile flash memory). In various embodiments, hardwired circuitry (e.g. special purpose hardware) may be used in combination with software instructions to implement the present invention. Thus the techniques are not limited to any specific combination of hardware circuitry and software, or to any particular source for the instructions executed by the set of one or more data processing systems.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A vehicle comprising:
    a chassis;
    a driver seat movably coupled to the chassis, the driver seat movable laterally along a first row of an interior of the vehicle between three positions in the first row, the three positions including a left position, a right position, and a center position, wherein there is no passenger seat in the first row;
    a driver control assembly movably coupled to the chassis, the driver control assembly including a steering wheel, a brake pedal, and an accelerator pedal, the driver control assembly movable laterally along a dashboard that is in front of the first row, the driver control assembly being laterally movable between the three positions, and the driver seat and the driver control assembly positionable in each of the three positions to allow a driver to drive the vehicle in any one of the three positions.

2. The vehicle as in claim 1, the vehicle further comprising:
    a first rear seat and a second rear seat coupled to the chassis in a second row in the interior, the second row being behind the first row; and wherein there is no passenger seat in the first row.

3. The vehicle as in claim 2 wherein the driver seat and the driver control assembly are movable laterally along a set of rails coupled to the chassis and wherein lateral movement includes either movement along a line or along an arc.

4. The vehicle as in claim 3 wherein the driver seat and the driver control assembly are mechanically coupled together so they move laterally together when moving between the three positions.

5. The vehicle as in claim 3 wherein the driver seat and the driver control assembly move separately when they laterally move between the three positions.

6. The vehicle as in claim 3 wherein the first rear seat and the second rear seat can each be rotated, within the second row, away from a longitudinal centerline of the vehicle.

7. The vehicle as in claim 3 wherein passengers in the first rear seat and the second rear seat can extend their legs into the first row when the driver seat is in the center position and wherein there is insufficient leg room for an adult passenger in one of the first or second rear seats when the driver seat is in front of the adult passenger.

8. The vehicle as in claim 2 wherein the driver control assembly incorporates drive by wire connections with the steering, braking, and acceleration control systems of the vehicle and the drive by wire connections are coupled to the vehicle so they remain intact even when the driver control assembly is laterally moved between the three positions.

9. The vehicle as in claim 8 wherein the drive by wire connections include a set of rails and a corresponding set of contact elements for ohmic connections.

10. The vehicle as in claim 8 wherein each of the drive by wire connections includes a primary ohmic connection and a secondary redundant connection.

11. The vehicle as in claim 2 wherein the driver seat and the driver control assembly each lock into one of the three positions when the vehicle is not in park mode.

12. The vehicle as in claim 11 wherein the driver seat and the driver control assembly can be moved when the vehicle is in the park mode.

13. The vehicle as in claim 12, wherein the vehicle further comprises:
    a first set of one or more sensors to sense a passenger in the first rear seat;
    a second set of one or more sensors to sense a passenger in the second rear seat;
    a set of one or more motors coupled to the driver seat and to the driver control assembly to laterally move the driver seat and the driver control assembly;
    a data processing system coupled to the set of one or more motors and coupled to the first set and the second set of sensors and coupled to receive a vehicle drive mode signal that indicates the park mode, wherein the data processing system prevents movement of the driver seat, even when the vehicle is in the park mode, when a passenger is sensed in either of the first rear seat or the second rear seat.

14. The vehicle as in claim 13 wherein the first set of sensors include at least one of a first load sensor in the first rear seat and a first camera to acquire images of the first rear seat, and the second set of sensors include at least one of a second load sensor in the second rear seat and a second camera to acquire images of the second rear seat.

15. The vehicle as in claim 2 wherein the dashboard includes a set of one or more displays that span substantially an entire lateral length of the dashboard.

16. The vehicle as in claim 15 wherein content displayed on the set of one or more displays is based in part on the position of the driver seat and wherein driving critical information is always displayed directly in front of the position of the driver seat.

17. The vehicle as in claim 2 wherein the driver seat is directly accessible in the interior without opening a door in the interior of the vehicle.

18. The vehicle as in claim 2 wherein the driver seat includes a seatbelt that originates on and terminates on the driver seat.

19. A vehicle comprising:
   a chassis;
   a driver seat movably coupled to the chassis, the driver seat movable laterally along a set of one or more rails along a first row of an interior of the vehicle between at least two positions which include a center position in the first row and at least one of a left position in the first row or a right position in the first row;
   a first rear seat and a second rear seat coupled to the chassis in a second row of the interior, the second row being behind the first row;
   a driver control assembly movably coupled to the chassis, the driver control assembly including a steering wheel, a brake pedal, and an accelerator pedal, the driver control assembly movable laterally along a dashboard that is in front of the first row, the driver control assembly being laterally movable between the at least two positions, and the driver seat and the driver control assembly positionable in each of the at least two positions to allow a driver to drive the vehicle in any of the at least two positions.

20. The vehicle as in claim 19 wherein the driver seat and the driver control assembly move separately when they laterally move between the at least two positions.

21. The vehicle as in claim 19 wherein the first rear seat and the second rear seat can each be rotated, within the second row, away from a longitudinal centerline of the vehicle.

22. The vehicle as in claim 19 wherein the driver control assembly uses drive by wire connections for steering, braking, and acceleration control of the vehicle.

23. The vehicle as in claim 22 wherein the driver seat and the driver control assembly each mechanically lock into one of the at least two positions when the vehicle is not in park mode and can be moved when the vehicle is in the park mode.

24. The vehicle as in claim 23, wherein the vehicle further comprises:
   a first set of one or more sensors to sense a passenger in the first rear seat;
   a second set of one or more sensors to sense a passenger in the second rear seat;
   a set of one or more motors coupled to the driver seat and to the driver control assembly to laterally move the driver seat and the driver control assembly;
   a data processing system coupled to the set of one or more motors and coupled to the first set and the second set of sensors and coupled to receive a vehicle drive mode signal that indicates the park mode, wherein the data processing system prevents movement of the driver seat, even when the vehicle is in the park mode, when a passenger is sensed in either of the first rear seat or the second rear seat.

25. The vehicle as in claim 24 wherein the first set of sensors include a first load sensor in the first rear seat and a first camera to acquire images of the first rear seat, and the second set of sensors include a second load sensor in the second rear seat and a second camera to acquire images of the second rear seat.

26. The vehicle as in claim 25 wherein the dashboard includes a set of one or more displays.

27. The vehicle as in claim 26 wherein content displayed on the set of one or more displays is based in part on the position of the driver seat.

28. The vehicle as in claim 1 wherein the vehicle additionally allows the driver to drive the vehicle in additional positions of the driver seat between the left position and the right position.

29. The vehicle as in claim 1, wherein the vehicle further comprises:
   one or more electric motors coupled to the chassis to propel the vehicle;
   one or more batteries coupled to the one or more electric motors to provide power to the one or more electric motors.

30. The vehicle as in claim 14, wherein the data processing system verifies a set of drive by wire connections for steering and braking are functioning properly before enabling the vehicle to be driven after the driver seat has been moved.

31. A method for controlling a driver seat in a vehicle, the method comprising:
   Receiving, at a data processing system, a command to move a driver seat in a vehicle having a first rear seat and a second rear seat;
   determining whether the vehicle is in a park mode;
   determining, through one or more sensors coupled to the data processing system, whether a passenger is in either of the first rear seat or the second rear seat;
   in response to the command and to determining that the vehicle is in the park mode and determining that no passenger is in either of the first rear seat and the second rear seat, moving the driver seat to a requested position along a front row of the vehicle.

32. The method as in claim 31 wherein the one or more sensors include one or more cameras and one or more load sensors to determine whether a passenger is in either of the first or the second rear seats.

33. The method as in claim 31, wherein the method further comprises:
   adjusting content on one or more displays on a dashboard of the vehicle in response to the command and wherein driving critical information is always displayed directly in front of the position of the driver seat.

34. The method as in claim 31 wherein the method further comprises:
   verifying that the drive by wire connections for a driver control assembly are operative and intact after moving the driver seat; and
   enabling operation of the vehicle if the drive by wire connections are verified to be operative and intact.

35. The method as in claim 34 wherein the method is performed at least in part by one or more data processing systems that are coupled to one or more non-transitory memories that store executable program instructions which when executed cause the method to be performed.

* * * * *